United States Patent [19]

Foulletier et al.

[11] 3,873,619

[45]* Mar. 25, 1975

[54] PERFLUORO-ALIPHATIC SUBSTITUTED AMINOALCOHOLS

[75] Inventors: Louis Foulletier, Ouillins; Jean-Pierre Lalu, La Mulatiere, both of France

[73] Assignee: Products Chimiques Ugine Kuhlmann, Paris, France

[ * ] Notice: The portion of the term of this patent subsequent to Sept., 1990, has been disclaimed.

[22] Filed: Apr. 29, 1971

[21] Appl. No.: 138,808

Related U.S. Application Data

[63] Continuation-in-part of Ser. No. 74,884, Sept. 23, 1970, abandoned, which is a continuation of Ser. No. 819,478, April 25, 1969, abandoned, which is a continuation-in-part of Ser. No. 694,105, Dec. 28, 1967, abandoned.

[30] Foreign Application Priority Data

| Jan. 2, 1967 | France | 67.89676 |
| Sept. 15, 1967 | France | 67.121188 |
| Nov. 7, 1967 | France | 67.127254 |
| Apr. 29, 1969 | France | 69.149848 |
| Aug. 20, 1970 | France | 70.030550 |

[52] U.S. Cl.......... 260/563 C, 260/563 R, 260/573, 260/584 R
[51] Int. Cl.................................. C07c 91/06
[58] Field of Search........ 260/584 R, 563 R, 563 C, 260/573

[56] References Cited
UNITED STATES PATENTS
2,585,230  2/1952  Coover et al................. 260/583 EE

*Primary Examiner*—Lorraine A. Weinberger
*Assistant Examiner*—Richard L. Raymond
*Attorney, Agent, or Firm*—Pennie & Edmonds

[57] ABSTRACT

The invention comprises perfluoroalkyl substituted aminoalcohols of the formula

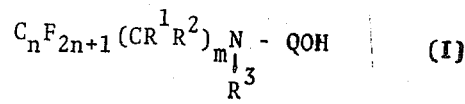
(I)

wherein $n$ is an integer from 1 to about 20, $m$ is 2 or 4, $R^1$ and $R^2$ each is a hydrogen atom or a lower alkyl containing 1 to 3 carbon atoms, Q is a radical $—(CHR)_q—$ wherein R is a hydrogen atom or a lower alkyl containing 1 to 3 carbon atoms and $q$ is an integer from 1 to 10, $R^3$ is a hydrogen atom, an alkyl radical containing 1 to 20 carbon atoms, a cycloalkyl radical containing 3 to 12 carbon atoms, a cycloalkenyl radical containing 5 to 12 carbon atoms, an N or O ring substituted cycloalkenyl containing 5 to 12 carbon atoms, an aryl radical, the radical $—QOH$, the radical $C_nF_{2n+1}(CR^1R^2)_m—$ or $R^3$ and Q are joined in the form of an alkylene radical of the formula

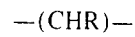

wherein $p$ is an integer from 2 to 6. The invention also comprises perfluoroaliphatic substituted aminoalcohols of the formula

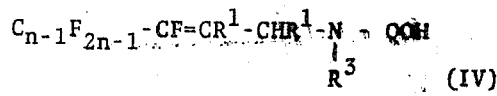
(IV)

and mixtures of products of formula IV with

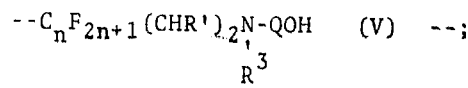

in which $R^1$, $R^3$ and Q have the same meaning as designated above and where $n$ is an integer from 4 to 20. The perfluoroaliphatic substituted aminoalcohols according to this invention have varied application. They can be used for the synthesis of intermediates, particularly, as auxiliaries in the textile industry. They also possess surface tension properties which make them useful as surface-active agents (surfactants).

29 Claims, No Drawings

PERFLUORO-ALIPHATIC SUBSTITUTED AMINOALCOHOLS

CROSS REFERENCE TO RELATED APPLICATIONS

This is a continuation-in-part application of our previously filed application, Ser. No. 74,884 filed Sept. 23, 1970, now abandoned, which is a continuation application of our previously filed application, Ser. No. 819,478 filed Apr. 25, 1969, now abandoned, which in turn is a continuation-in-part of our earlier filed application, Ser. No. 694,105 filed Dec. 28, 1967, now abandoned.

BACKGROUND OF THE INVENTION

I. Field of the Invention

This invention relates to perfluoroaliphatic substituted aminoalcohol mixtures and the method for preparing the same.

II. Description of the Prior Art

It is well known that nonfluorinated alkyl halides of the formula $C_nH_{2n+1}X$ wherein $n$ is an integer and X is a halogen, react with ammonia and with amines to produce various substituted amine and quaternary ammonium salts. However, in the case of fluorinated alkyl halides of the formula $$C_nF_{2n+1}-CH_2CH_2-Y$$

wherein $n$ and Y each has the same meaning as stated above, the halides become readily dehydrohalogenated in the presence of nucleophilic agents such as various amines which include the tertiary amine to yield fluorinated olefins of the formula $$C_nF_{2n+1}-CH=CH_2$$

SUMMARY OF THE INVENTION

We have discovered that it is possible according to the method of this invention to react perfluoroalkyl iodides or bromides with aminoalcohols to produce perfluoroaliphatic substituted aminoalcohols as the principal reaction products. Broadly stated, the perfluoroalkyl substituted aminoalcohols of the invention have the formula

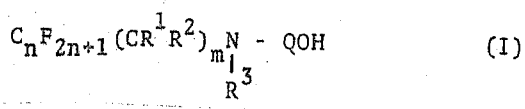  (I)

wherein $n$ is an integer from 1 to about 20, $m$ is 2 or 4, $R^1$ and $R^2$ each is a hydrogen atom or a lower alkyl containing 1 to 3 carbon atoms, Q is a radical $-(CHR)_q-$ wherein R is a hydrogen atom or a lower alkyl containing 1 to 3 carbon atoms and $q$ is an integer from 1 to 10, and $R^3$ is a hydrogen atom, an alkyl radical containing 1 to 20 carbon atoms, a cycloalkyl radical containing 3 to 12 carbon atoms, a cycloalkenyl radical containing 5 to 12 carbon atoms, an aryl radical, the radical $-QOH$, the radical $C_nF_{2n+1}(CR^1R^2)_m-$ or $R^3$ and Q are joined in the form of an alkylene radical of the formula $-(CHR)_p-$ wherein $p$ is an integer from 2 to 6.

The perfluoroaliphatic substituted amines of the invention are prepared by reacting at a temperature in the range between 0° and 200°C. a perfluoroalkyl halide of the formula

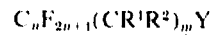  (II)

wherein $n$, $m$, $R^1$ and $R^2$ each has the same meaning as defined hereinabove and Y is an iodine or a bromine atom with an aminoalcohol of the formula $HR^3N-QOH$ (III) wherein $R^3$ amd Q each also has the same meaning as previously stated.

When at least one of the radicals $R^1$ and $R^2$ is hydrogen, $m$ is equal to 2, and $n$ is equal to 4 to 20, the reaction of compounds II and III simultaneously yield compounds of the formula

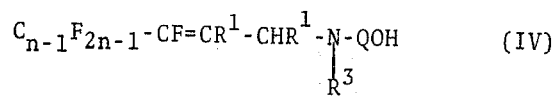  (IV)

together with compounds of the formula

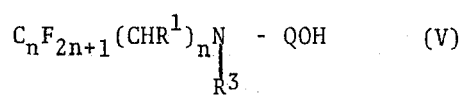  (V)

in which $R^1$, $R^3$ and Q have the same meaning as designated above and $n$ is an integer of 4 to 20 which constitutes novel compounds and novel mixtures of the compounds of formulas IV and V.

DESCRIPTION OF THE PREFERRED EMBODIMENT

Perfluoroalkyl halides of the formula

  (II)

are reacted with aminoalcohols of the formula $HR^3N-QOH$ to produce perfluoroalkyl amines of the formula

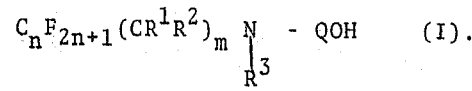  (I).

When the formula II compound of this process is selected to be a compound of the formula $$C_nF_{2n+1}(CHR^1)_2Y$$  (VI)

wherein $R^1$, $R^3$ and Q have the same meaning as previously defined and $n$ is an integer of 4 to 20, there is simultaneously produced a compound of the formula

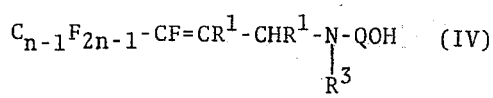  (IV)

together with a compound of the formula

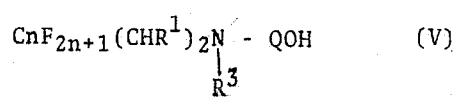  (V)

The process of this invention may be carried out with or without the use of a solvent. The suitable solvents for the reaction preferably have boiling points below about 200°C. Examples of these solvents are as follows:

I. Halogenated hydrocarbons having from 1 to 4 carbon atoms; fluorinated, chlorinated, fluoro-chlorinated hydrocarbons preferably chloroform, carbon tetrachloride, methylene chloride, ethylene chloride, 1,1-dichloroethylene, difluorotetrachlorethane, trichlorotrifluoroethane;

II. Primary, secondary, or tertiary alcohols with 1 to 10 carbon atoms; n-butanol, isobutanol, n-pentanol, isopentanol, n-hexanol, 2-hexanol, 2-heptanol, n-heptanol, and n-octanol;

III. Aliphatic, cyclic, heterocyclic, or aromatic ethers; ethyl, propyl, or isopropyl ethers, dioxane, tetrahydrofuran, tetrahydropyrane, and anisole;

IV. Aliphatic, cyclic, or aromatic ketones; 2-butanone, 2-pentanone, 3-pentanone, cyclohexanone, and acetophenone;

V. Aliphatic or aromatic esters; propyl formate, methyl acetate, ethyl acetate, butyl acetate, phenyl acetate, methyl benzoate, and ethyl benzoate;

VI. Tertiary amines; pyridine, 2-methylpyridine 2-methylpyridine and N-methylpiperidine.

In addition, aprotic solvents can also be used. The suitable solvents of this type include dimethylformamide, dimethylsulfoxide and hexamethylphosphorotriamide. Among the various solvents mentioned, we prefer to use the tertiary amines.

As stated previously, the perfluoroalkyl halides of the following formula $$C_nF_{2n+1}(CR^1R^2)_mY$$

wherein $n$ is an integer from 1 to about 20, $m$ is 2 or 4, $R^1$, $R^2$ each is a hydrogen atom or a lower alkyl containing 1 to 3 carbon atoms and Y is an iodine or a bromine atom, are suitable as starting material for preparing the perfluoroalkyl substituted aminoalcohols of this invention. We, however, prefer to use iodides wherein $n$ is in the range between 4 to 12, $m$ is 2 and $R^1$ and $R^2$ each is a hydrogen atom. The preferred iodides are prepared by reacting $C_nF_{2n+1}I$ with ethylene in presence of a free radical generating initiator such as heat, $\alpha,\alpha$-azobisisobutyronitrile, benzoyl peroxide and the like. The reaction generates compounds containing an even number of methylene groups $-CH_2)_m-$.

When the preferred iodides are employed, the process of this invention will simultaneously produce a formula IV compound admixed with a formula V compound.

The suitable amines for the process of the invention are primary and secondary aminoalcohols of the formula

HR³—N—QOH

When $R^3$ is an alkyl, it typically may be a straight chain or a branched alkyl including methyl, ethyl, n-propyl, i-propyl, n-butyl, t-butyl, i-butyl, n-pentyl, 2-pentyl, n-hexyl, n-heptyl, 3-heptyl, n-dodecyl, and n-octadecyl. When $R^3$ is an alkenyl, it may be vinyl, allyl, propenyl, i-propenyl, 2-penten-2-yl, or 3-hepten-3-yl. When $R^3$ is a cycloalkyl radical, it may be cyclopropyl, cyclobutyl, cyclopentyl, cyclopenten-1-yl, cyclohexyl, cyclohexen-3-yl, 3-methylcyclohexen-3-yl, or 4-methylcyclohexen-3-yl. When $R^3$ is an aryl, it may be phenyl or naphthyl. The suitable cycloalkenyls include 2-tetrahydrofuryl, 2-furyl, and 4-pyridyl.

When the reaction product, the perfluoroaliphatic substituted aminoalcohol, contains a double bond, the reaction is preferably carried out in the presence of a polymerization inhibitor such as hydroquinone.

In the case where $R^3$ is a hydrogen atom, it is difficult to produce a pure perfluoroalkyl aminoalcohol. The reaction generally produces a mixture of

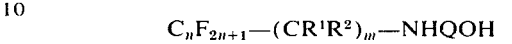
$$C_nF_{2n+1}-(CR^1R^2)_m-NHQOH$$

as the main product and

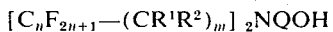
$$[C_nF_{2n+1}-(CR^1R^2)_m]_2NQOH$$

as secondary product. We found that the secondary product can be substantially eliminated by using a stoichiometric excess of the starting aminoalcohol with respect to the perfluoroalkyl iodide or bromide and in the presence of an alcoholic solvent stated hereinabove.

The perfluoroaliphatic substituted aminoalcohols according to the invention have very interesting and varied application. They can be used for the synthesis of intermediates, particularly as auxiliaries in the textile industry, for example, as hydrophobic, oleophobic, and anti-spotting agents and in the preparation of dyestuffs. They have surface tension properties such that they can also be used as surface-active agents (surfactants). For example, $C_6F_{13}-C_2H_4-NH(C_2H_4)OH$ dissolved in water at a weight concentration of 0.023 percent at 32°C. lowers the surface tension of the water to 21 dynes/cm.

Further to illustrate this invention, specific examples are described hereinbelow. The following examples, 1–12, also produce mixtures of saturated and unsaturated perfluoroaliphatic aminoalcohols as reported in examples 13–20. However, the corresponding unsaturated amines were not separated or recovered therefrom and therefore, the yields reported for the saturated perfluoroaliphatic amines are in fact the yields of the mixture. Examples 21–24 did not yield a mixture of amines.

EXAMPLE 1

A mixture of $C_6F_{13}-C_2H_4I$ (23.7 grams, 0.05 mole) and ethanolamine (12.2 grams, 0.2 mole) dissolved in ethyl alcohol (100 cm³) was heated with reflux, at 78°C., for 8 hours, under continuous agitation. The mixture was then distilled and there were obtained two fractions and a residue.

a. 58°C/400 mm Hg fraction, 12 grams: This fraction was made up of ethyl alcohol (60 percent) and $C_6F_{13}-CH=CH_2$ (40 percent).

b. 62°C/400 mm Hg fraction: This fraction was made up of ethyl alcohol.

c. Residue: The residue was agitated with 60 cm³ of a 15 percent by weight aqueous solution of NaOH. The resulting solution was exhausted by five successive washings with 60 cm³ of ethyl ether, and the ether extracts were dried over anhydrous sodium sulfate. After evaporation of the ether, the liquid was distilled and there were obtained two fractions and a residue:

1. volatile products, 7.5 grams: This fraction was made up of ethyl alcohol (80 percent and $C_6F_{13}-CH=CH_2$ (20 percent);

2. 85°C/1 mm Hg, 8.5 grams: This fraction was a mixture of $C_6F_{13}-C_2H_4-NH-CH_2-CH_2OH$ (main product) and $(C_6F_{13}-C_2H_4)_2N(C_2H_4)OH$ (secondary product);

3. Residue, 0.5 grams.

The yields of the experiment were 42 percent with respect to substitution products and 50 percent with respect to $C_6F_{13}-CH=CH_2$.

EXAMPLE 2

A mixture of $C_6F_{13}-C_2H_4I$ (47.4 grams, 0.1 mole) and ethanolamine (24.4 grams, 0.4 mole) dissolved in 130 cm³ of chloroform was heated with reflux at 68°C., for 6 hours, under continuous agitation. This mixture was distilled and there was obtained one fraction and a residue.

a. 44°C/300 mm Hg fraction, 183 grams: This fraction was made up of chloroform (97.9 percent), $C_6F_{13}-C_2H_4I$ (0.3 percent) and $C_6F_{13}-CH=CH_2$ (1.8 percent).

b. Residue: The residue was agitated with 60 cm³ of a 15 percent by weight aqueous solution of NaOH. The resulting solution was exhausted by five successive washings with 50 cm³ of ethyl ether, and the ether extracts were then dried over anhydrous sodium sulfate. After evaporation of the ether, the liquid was distilled and there were obtained two fractions and a residue.

1. volatile products, 9.7 grams: This fraction contained $C_6F_{13}-CH=CH_2$ (22 percent), ethyl ether (69 percent), chloroform (6 percent), and $C_6F_{13}-C_2H_4I$ (3 percent);

2. 115°C/4-5 mm Hg fraction, 19.2 grams: This fraction was made up of $C_6F_{13}-C_2H_4-NH-C_2H_4-OH$ (80 percent) and $(C_6F_{13}-C_2H_4)_2N-CH_2-CH_2-OH$ (20 percent);

3. Residue, 1 gram: This residue was made up of the iodohydrates of the products of fraction 2.

The yields of the experiment reached 41 percent for $C_6F_{13}-CH=CH_2$, and 49 percent for the substitution products. The $C_6F_{13}-C_2H_4I$ recovered represented 7 percent of the starting fluorinated product.

EXAMPLE 3

A mixture of $C_6F_{13}-C_2H_4I$ (47.4 grams, 0.1 mole) and ethanolamine (24.4 grams, 0.4 mole) dissolved in amyl alcohol (100 cm³) was heated with reflux at 130°-138°C., for 8 hours, under continuous agitation. The mixture was distilled and there were obtained two fractions and a residue.

a. 55°C/130 mm Hg fraction, 4.5 grams: This fraction was made up of two phases, the less dense being amyl alcohol, and the more dense containing $C_6F_{13}-CH=CH_2$ (49 percent), amyl alcohol (47 percent), impurities (4 percent).

b. 70°C/50 mm Hg fraction: This fraction was made up of amyl alcohol.

c. Residue: This residue was agitated with 60 cm³ of a 10 percent by weight aqueous solution of NaOH. The resulting solution was exhausted by five successive washings with 50 cm³ of ethyl ether, and the ether extracts were then dried over anhydrous sodium sulfate. After evaporation of the ether, the liquid was distilled and there were obtained two fractions and a residue:

1. 35°C/2-3 mm Hg fraction, 4.4 grams: made up of amyl alcohol;

2. 95°C/2-3 mm Hg fraction, 28.8 grams: made up mainly of $C_6F_{13}-C_2H_4-NH-CH_2CH_2OH$, contaminated with $(C_6F_{13}-C_2H_4)_2N-CH_2-CH_2OH$ subproduct;

3. Residue: 2.8 grams of the iodohydrate of the products of fraction 2.

The yields of the experiment were 11 percent with respect to $C_6F_{13}-CH=CH_2$, and 80 percent with respect to the substitution products.

EXAMPLE 4

A mixture of $C_6F_{13}-C_2H_4I$ (47.4 grams, 0.1 mole) and N-methylethanolamine (30 grams, 0.4 mole) dissolved in ethyl alcohol (100 cm³) was heated with reflux, at 78°C., for 8 hours, under continuous agitation. The mixture was distilled and there were obtained two fractions and a residue.

a. 58°C/400 mm Hg fraction: This fraction was washed with water, which gave an aqueous phase at the top and a dense organic phase. The latter, after drying over anhydrous sodium sulfate, weighed 3.5 grams; it was made up of $C_6F_{13}-CH=CH_2$.

b. 62°C/400 mm Hg fraction: This fraction was made up of ethyl alcohol.

c. Residue: This residue was agitated with 80 cm³ of a 15 percent by weight aqueous solution of NaOH. The resulting solution was subjected to five successive washings with 60 cm³ of ethyl ether and the ether extracts were dried over anhydrous sodium sulfate. After evaporation of the ether, the liquid was distilled and there were obtained two fractions and a residue:

1. 60°-107°C/4 mm Hg fraction, 4 grams: This fraction contained $C_6F_{13}-C_2H_4-N(CH_3)-CH_2-CH_2OH$ (91 percent), $CH_3-NH-CH_2-CH_2OH$ (7 percent), and impurities (2 percent);

2. 107°C/4 mm Hg fraction, 27 grams; made up of $$C_6F_{13}-C_2H_4-\underset{\underset{CH_3}{|}}{N}-CH_2CH_2OH$$

3. Residue: 1 gram of iodohydrate of $$C_6F_{13}-CH_2-CH_2-\underset{\underset{CH_3}{|}}{N}-CH_2-CH_2OH$$

The yields of the experiment were 74 percent for $$C_6F_{13}-C_2H_4-\underset{\underset{CH_3}{|}}{N}-C_2H_4OH$$

and 10 percent for $C_6F_{13}-CH=CH_2$.

EXAMPLE 5

A mixture of $C_6F_{13}-C_2H_4I$ (47.4 grams, 0.1 mole) and N-methylethanolamine (30 grams, 0.4 mole) dissolved in amyl alcohol (85 cm³ was heated with reflux, at 137°C., for 6 hours, under continuous agitation. The mixture was distilled and there were obtained two fractions and a residue.

a. 42°C/125 mm Hg fraction: This fraction was made up of two phases which were decanted. The denser phase (3 grams) was made up of $C_6F_{13}-CH=CH_2$ (49 percent), amyl alcohol, (47 percent), and impurities (4 percent). The less dense phase was made up of amyl alcohol.

b. 70°C/50 mm Hg fraction: Amyl alcohol c. Residue: This residue was agitated with 80 cm³ of a 10 percent by weight aqueous solution of NaOH. The solution was subjected to five successive washings with 50 cm³ of ether, and the etherized extracts were dried over anhydrous sodium sulfate. After evaporation of the ether, the liquid was distilled and there were obtained two fractions and a residue:
1. 30°C/2 mm Hg fraction: amyl alcohol;
2. 88°C/2 mm Hg fraction: 34.4 grams of

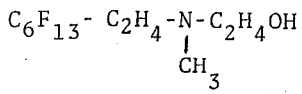

3. Residue: 1.5 grams of $C_6F_{13}$—$C_2H_4$—N(CH$_3$)—CH$_2$—CH$_2$OH.

The yields of the experiment reached 85 percent for $C_6F_{13}$—$C_2H_4$—N(CH$_3$)—$C_2H_4$OH and 5 percent for $C_6F_{13}$—CH=CH$_2$.

EXAMPLE 6

A mixture of $C_6F_{13}$—$C_2H_4$—I (47.4 grams; 0.1 mole) and ethanolamine (24.4 grams; 0.4 mole) dissolved in amyl alcohol (100 cm³) was heated with reflux, at 130°–138°C., for 6 hours, under continuous agitation. This mixture was distilled and there were obtained two fractions and a residue:

a. 55°C/130 mm Hg fraction; 7.5 grams: This fraction was made up of two phases, the less dense being amyl alcohol, and the more dense (3.8 grams) containing $C_6F_{13}$—CH=CH$_2$ (98 percent) and amyl alcohol (2 percent);

b. 70°C/50 mm Hg fraction: This fraction was made up of amyl alcohol;

c. Residue: The residue was agitated with 60 cm³ of a 10 percent by weight aqueous solution of NaOH. The resulting solution was exhausted by five successive washings with 50 cm³ of ethyl ether, and the ether extracts were then dried over anhydrous sodium sulfate. After evaporation of the ether, the liquid was distilled and there were obtained two fractions and a residue:

1. 45°C/10 mm Hg fraction: This fraction was made up of amyl alcohol;
2. 87°C/2 mm Hg fraction, 28.3 grams: This fraction was made up of $C_6F_{13}$—$C_2H_4$—NH—$C_2H_4$OH;
3. Residue, 2.4 grams: This residue is the iodohydrate of $C_6F_{13}$—$C_2H_4$—NH—$C_2H_4$OH.

The yields of the experiment were 11 percent with respect to $C_6F_{13}$—CH=CH$_2$, and 75 percent with respect to $C_6F_{13}$—$C_2H_4$—NH—$C_2H_4$OH.

EXAMPLE 7

$C_4F_9$—$C_2H_4$—I (37.4 grams; 0.1 mole) was added to a solution of $C_6H_5$—NH—$C_2H_4$OH (54.8 grams; 0.4 mole) in amyl alcohol (100 cm³) (a slight heating up was noted during this addition). The temperature of the reaction medium was raised to 135°–138° during 4 hours, and it was then distilled. Four fractions were thus recovered:

a. 55°–65°/33 mm fraction: 19.1 grams, made up of $C_4F_9$—CH=CH$_2$ (2 percent), amyl alcohol (83 percent) and $C_4F_9$—$C_2H_4$I (15 percent).

b. 65°/33 mm fraction, made up of amyl alcohol.

c. 90°–100°/0.1 mm fraction: 24.1 grams; made up of $C_6H_5$—NH—$C_2H_4$OH (50 percent) and $C_4F_9$—$C_2H_4$—N($C_6H_5$)—$C_2H_4$OH (50 percent).

d. 100°/0.1 mm fraction: 30.5 grams, made up of $C_6H_5$—NH—$C_2H_4$OH (90 percent) and $C_4F_9$—$C_2H_4$—N($C_6H_5$)—$C_2H_4$OH (10 percent).

The degree of transformation and the yield for $C_4F_9$—$C_2H_4$—N($C_6H_5$)—$C_2H_4$OH were, respectively, 65 percent and 82 percent.

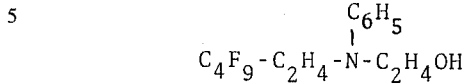

has a boiling point near 92° under a pressure of 0.1 mm of mercury.

EXAMPLE 8

$C_6H_{11}$—NH—$C_2H_4$OH (21.45 grams; 0.15 mole) was added drop by drop to a solution of $C_4F_9$—$C_2H_4$—I (37.4 grams; 0.1 mole) in amyl alcohol (100 cm³). During the operation (four hours) the reaction medium was held at 70°C. The mixture was then distilled and there were obtained three fractions and a residue:

a. <25°/21 mm Hg fraction; 6.2 grams, made up of $C_4F_9$—CH=CH$_2$ (92 percent) and $C_4F_9$—$C_2H_4$—I (8 percent).

b. 44°/20 mm fraction; 10.4 grams, made up of amyl alcohol (41 percent) and $C_4F_9$—$C_2H_4$—I (59 percent).

c. 44°/5 mm fraction; made up of amyl alcohol.

d. Solid residue.

This residue was agitated with 50 cm³ of a 10 percent by weight aqueous solution of NaOH. The resulting solution was exhausted by extraction with four portions of ethyl ether of 50 cm³. The ether extracts were dried over anhydrous sodium sulfate, the ethyl ether was eliminated by evaporation, and the residual liquid was distilled. There were thus obtained 24.6 grams of a mixture of $C_6H_{11}$—NH—$C_2H_4$OH (75 percent) and $C_4F_9$—$C_2H_4$—N($C_6H_{11}$)—$C_2H_4$OH (25 percent).

The degree of transformation and the yield of $C_4F_9$—$C_2H_4$—N($C_6H_{11}$)—$C_2H_4$OH are, respectively, 30 percent and 40 percent. The unreacted $C_4F_9$—$C_2H_4$—I was 25 percent recovered.

EXAMPLE 9

A mixture of $C_8F_{17}$—$C_2H_4$—I (114.8 g; 0.200 mole), ethanolamine (48.8 g; 0.800 mole), and amyl alcohol (200 cc) was heated at 130° during four hours, under constant stirring. Upon distillation of the reaction mixture, two fractions and a residue were obtained:

a. Fraction 45°–50°/20 mm Hg: 65 g. This fraction is made up of two phases: the lighter is amyl alcohol, the denser is $C_8F_{17}$—CH=CH$_2$ (23 g; 0.051 mole).

b. Fraction 55°/20 mm Hg: amyl alcohol.

c. Solid residue.

This solid residue was stirred with 100 cc of a 10 percent aqueous solution of NaOH, and the resulting solution was extracted with ether (4 times 100 cc). The ethereal extracts were dried over anhydrous sodium sulfate and then distilled. Besides the ether, a fraction and a residue were thus obtained:

a. Fraction 115°/2 mm Hg: 58 g: $C_8F_{17}$—$C_2H_4$—NH—$C_2H_4$OH(0.114 mole).

b. Residue: 3.1 g. Solid was not identified

The conversion rate for $C_8F_{17}$—$C_2H_4$—NH—$C_2H_4$OH was 57 percent.

EXAMPLE 10

A mixture of $C_{10}F_{21}$—$C_2H_4$—I (45 g; 0.067 mole), ethanolamine (15.9 g; 0.26 mole), and amyl alcohol (70 cc) was heated at 115° during 4 hours, under constant stirring. The mixture was then stirred with 50 cc of a 10 percent aqueous solution of NaOH, and the resulting solution was extracted with ethyl ether (4 times 50 cc). After drying the etheral extracts over anhydrous sodium sulfate, and evaporation of the ether, two fractions were obtained by distillation:

a. Fraction 50°/20 mm Hg: made up of amyl alcohol.

b. Fraction 130°/1–2 mm Hg; 24.2 g was made up of $C_{10}F_{21}$—$C_2H_4$—NH—$C_2H_4$OH (0.040 mole), melting at 81°–82°.

The conversion rate was 60 percent.

EXAMPLE 11

A mixture of $C_8F_{17}$—$C_2H_4$—I (143.5 g; 0.250 mole), N-methylethanolamine (75 g; 1 mole), and amyl alcohol (250 cc) was heated at 130° during four hours, under constant stirring. Upon distillation of the mixture, two fractions and a residue were obtained:

a. Fraction 45°–50°/20 mm Hg: 18 g. This fraction is made up of two phases: the lighter is amyl alcohol, the denser is $C_8F_{17}$—CH=$CH_2$ (5 g.; 0.011 mole).

b. Fraction 51°/20 mm Hg: amyl alcohol.

c. Solid residue.

The solid residue was stirred with 150 cc of a 10 percent aqueous solution of NaOH, and the resulting solution was extracted with ethyl ether (5 times 100 cc). The ethereal extracts were dried over anhydrous sodium sulfate, and then distilled. Besides ethyl ether, two fractions and a residue were thus obtained:

a. Fraction 95°/150 mm Hg: amyl alcohol.

b. Fraction 103°/2 mm Hg: 108 g of

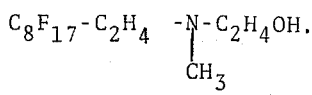

c. Residue: 1.9 g of a nonidentified solid.

Conversion rate for

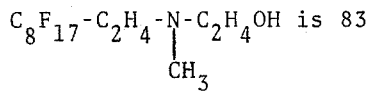

is 83 percent.

EXAMPLE 12

A mixture of $C_{10}F_{21}$—$C_2H_4$—I (13.5 g; 0.02 mole), of N-methylethanolamine (6 g; 0.08 mole), and amyl alcohol (20 cc) was heated at 100° during four hours, under constant stirring. Upon distillation of the mixture, a liquid fraction and a solid residue were obtained:

a. Fraction 51°/20 mm Hg. This fraction, made up of two phases, which were separated by decantation. The denser phase (1.6 g) was made up of amyl alcohol (3.7 percent) and of $C_{10}F_{21}$—CH=$CH_2$ (96.3 percent; 0.0028 mole); the less dense phase (13.2 g) consisted of amyl alcohol.

b. Solid residue.

This solid residue was stirred with 30 cc of a 10 percent aqueous solution of NaOH, the the resulting solution was extracted with ethyl ether (4 times 50 cc). After drying the ethereal extracts over anhydrous sodium sulfate and evaporating the ether, one fraction and a residue were obtained by distillation:

a. Fraction 118°/1 mm Hg: 8.3 g was made up of $C_{10}F_{21}$—$C_2H_4$—I (9 percent; 0.0014 mole) and of

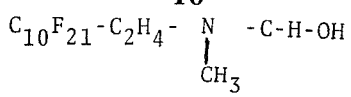

(91 percent; 0.0117 mole), the solid melted around 50°C.

b. Residue: 0.8 g of a nonidentified solid.

Conversion rate and yield of

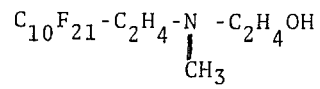

were 58.5 percent and 63 percent respectively.

EXAMPLE 13

A mixture of $C_6F_{13}$—$C_2H_9$I (47.4 g) ethanolamine (24.4 g) and amyl alcohol (100 cm³) were heated with reflux under constant agitation for 8 hours at 130°–138°C. Upon distillation, this mixture yielded four fractions and a residue.

a. 55°C/130 mm Hg. fraction: weighing 4.5 g contained two phases the volatile phase was amyl alcohol and the heavier phase contained 49 percent $C_6F_{13}$—CH=$CH_2$, 47 percent amyl alcohol and 4 percent impurities.

b. 70°C/50 mm Hg. fraction: contained amyl alcohol.

c. Residue: was mixed with 60 cm³ of a 10 percent by weight solution of aqueous NaOH and extracted five times with 50 cm³ of ethyl ether, the ether extracts being dried over anhydrous sodium sulfate. The ether was evaporated and upon distillation, the liquid yielded two fractions and a residue.

1. 35°C/2–3 mm Hg. fraction weighing 4.4 contained amyl alcohol.

2. 95°C/2–3 mm Hg. fraction weighing 28.4 g contained 12 percent $C_5H_{11}$CF=CH—$CH_2$—NH—$CH_2$—$CH_2$)H, and 82 percent $C_6F_{13}$—$C_2H_4$—NH—$CH_2$—$CH_2$OH.

3. Residue weighing 2.8 g contained primarily the iodohydrates of fraction (b).

The yields of the experiment were 11 percent $C_6F_{13}$—CH=$CH_2$, 14.5 percent $C_5F_{11}$—CF=CH—$CH_2$—NH—$CH_2$—$CH_2$OH and 65.5 percent $C_6F_{13}CH_2$—$CH_2$—NH—$CH_2$—$CH_2$—OH.

EXAMPLE 14

A mixture of $C_8F_{17}$—$C_2H_4$—I (114.8 g) ethanolamine (48.8 g) and amyl alcohol (200 cm³) were heated to 130°C under constant agitation for 4 hours. Distillation gave two fractions and a residue.

a. 45°–50°/20 mm Hg. fraction: weighing 65 g contained two layers, the volatile being amyl alcohol and the heavier, weighing 23 g containing for the most part $C_8F_{17}$—CH=$CH_2$.

b. 55°/20 mm Hg. fraction: contained mostly amyl alcohol.

c. Solid Residue: was mixed with 100 cm³ of a 10 percent by weight aqueous NaOH solution was extracted 4 times with diethyl ether. The ether extracts were dried upon anhydrous sodium sulfate and were distilled. Besides ether one fraction and a residue were obtained.

1. 115°/2 mm Hg. fraction weighing 58 g contained 84 percent $C_8F_{17}$—$C_2H_4$—NH—$C_2H_4$OH and 16 percent $C_7F_{15}$CF=CH—$CH_2$—NH—$C_2H_4$OH.

2. Residue: was a solid weighing 3.1 g and not identified.

Yields for the experiment were 48 percent for $C_8H_{17}-C_2H_4-NH-C_2H_4OH$ and 9 percent $C_7H_{15}-CF=CH-NH-C_2H_4OH$.

EXAMPLE 15

A mixture of $C_{10}F_{21}-C_2H_4-I$ (45 g) ethanolamine (15.9 g) and amyl alcohol (70 cm³) were heated to 115° for 4 hours under constant agitation. The solution was mixed with a 10 percent aqueous NaOH (50 cm³) solution, then extracted 4 times with ethyl ether (50 cm³). After the ether extracts were dried upon anhydrous sodium sulfate and the ether evaporated, two fractions were obtained by distillation.

a. 50°/20 mm Hg. fraction: contained amyl alcohol.

b. 130°/1–2 mm Hg. fraction: weighing 24.2 g contained 90 percent of $C_{10}F_{21}-C_2H_4-NH-C_2H_4OH$ having a melting point of 81°–82° and 10 percent $C_9F_{19}-CF=CH-NH-C_2H_4OH$.

Yields for the experiment were 54 percent for $C_{10}F_{19}-CF=CH-CH_2-NH-C_2H_4OH$.

EXAMPLE 16

A mixture of $C_6F_{13}-C_2F_{13}I$ (47.4 g) N-methylethanolamine (30 g) and amyl alcohol (85 cm³) were heated with reflux at 137°C under constant agitation for 6 hours and upon distillation yielded two fractions and a residue.

a. 42°C/125 mm Hg. fraction: upon decanting gave two layers; the heavier layer weighing 3 g contained 49 percent $C_6F_{13}-CH=CH_2$, 47 percent amyl alcohol and 4 percent impurities while the lighter layer contained amyl alcohol.

b. 70°C/50 mm Hg. fraction: contained mostly amyl alcohol.

c. Residue: was mixed with 80 cm³ of a 10 percent by weight aqueous solution of NaOH. This solution was extracted 5 times with ether, the ether extracts then being dried on anhydrous sodium sulfate. After evaporation of the ether, upon distillation two fractions and a residue were obtained.

1. 30°C/2 mm Hg. fraction contained mostly amyl alcohol.

2. 88°C/2 mm Hg. fraction weighing 33.4 g consisted of 35 percent of

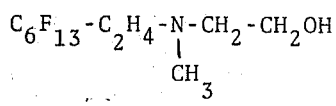

and 65 percent of

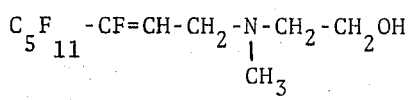

3. Residue weighing 5 g was mostly the iodohydrate of $C_6F_{13}-C_2H_4-N(CH_3)-CH_2-CH_2OH$.

Yields for the experiment were 35 percent for $C_6F_{13}-C_2H_4-N(CH_3)-CH_2-CH_2OH$, 5 percent for $C_6F_{13}-CH=CH_2$ and 55 percent for

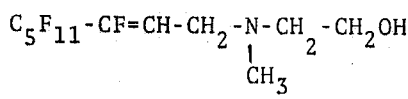

EXAMPLE 17

A mixture of $C_8F_{17}-C_2H_4-I$ (143.5 g), N-methylethanolamine (75 g) and amyl alcohol (25 cm³) were heated to 130° under constant agitation for 4 hours and upon distillation gave two fractions and a residue.

a. 45°–50°/20 mm Hg. fraction: weighing 18 g contained a lighter layer of amyl alcohol and a heavier layer weighing 5 g of $C_8F_{17}-CH=CH_2$.

b. 51°/20 mm Hg. fraction: was mostly amyl alcohol.

c. Solid Residue: was mixed with 150 cm³ of a 10 percent aqueous solution of NaOH and the resulting solution by weight extracted five times with 100 cm³ of ethyl ether. These ether extracts were dried upon anhydrous sodium sulfate and a distillate contained, besides ether, two fractions and a residue.

1. 95°/150 mm Hg. fraction was mostly amyl alcohol.

2. 103°/2 mm Hg. fraction weighing 105 g contained 39 percent

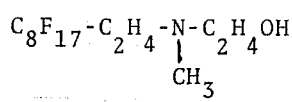

and 65 percent

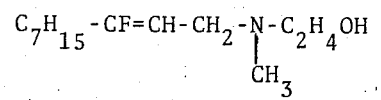

3. Solid residue weighing 1.9 g was not identified.

Yields for the experiment were 29 percent for

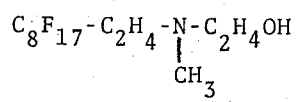

and 54 percent for

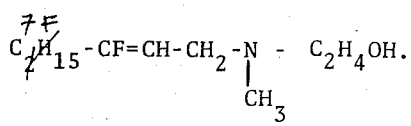

EXAMPLE 18

A mixture of $C_{10}F_{21}-C_2H_4-I$ (13.5 g), N-methylethanolamine (6 g) and amyl alcohol (20 cm³) were heated to 100° under constant agitation for 4 hours. A distillate contained a liquid fraction and a solid residue were obtained.

a. 51°/20 mm Hg. fraction: contained two phases which were decanted. The heavier phase weighing 1.6 g, contained 3.7 percent amyl alcohol and 96.3 percent $C_{10}F_{21}-CH=CH_2$ and the lighter phase weighing 13.2 g, contained amyl alcohol.

b. Solid Residue: was mixed with 30 cm³ of a 10 percent aqueous NaOH solution, this solution being extracted 4 times with 50 cm³ ethyl ether. After the ether extracts were dried upon anhydrous sodium sulfate, there was obtained, by distillation, a fraction and a residue:

1. 118°/1 mm Hg. fraction weighing 8.3 g contained 9 percent

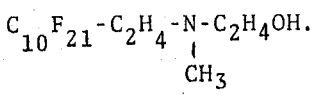

2. Solid residue weighing 0.8 g was unidentified.

Yields for the experiment were 24.5 percent for

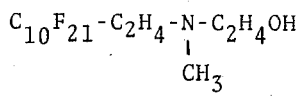

and 34 percent for

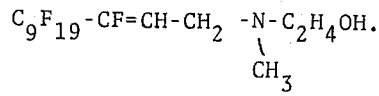

EXAMPLE 19

A mixture of $C_4F_9$—$C_2H_4$—I (37.4 g) were added to a solution of $C_6H_5$—NH—$C_2H_4OH$ (54.8 g) in amyl alcohol (100 cm³). A rapid heating up occured during this addition. The reaction medium was heated to 135°–138°C for 4 hours and distilled. Four fractions were obtained:

a. 55°–65°/33 mm Hg. fraction: weighing 19.1 g contained 2 percent $C_4F_9$—CH=$CH_2$, 83 percent amyl alcohol and 15 percent $C_4F_9$—$C_2H_4I$.

b. 65°/33 mm Hg. fraction: contained amyl alcohol.

c. 90°–100°/0.1 mm Hg. fraction: weighing 24.1 g contained 50 percent $C_6H_5$—NH—$C_2H_4OH$, 48 percent $C_4F_9$—$C_2H_4$—$N(C_6H_5)$—$C_2H_4OH$ and 2 percent unidentified impurities.

d. 100°/0.1 mm Hg. fraction: weighing 30.5 g contained 87 percent $C_6H_5$—NH—$C_2H_4OH$, 10 percent $C_4F_9$—$C_2H_4$—$N(C_6H_5)$—$C_2H_4OH$ which had a boiling point of about 92°C at 0.1 mm Hg.

EXAMPLE 20

$C_6H_{11}$—NH—$C_2H_4OH$ (21.45 g) was added drop by drop to a solution of $C_4F_9$—$C_2H_4$—I (37.4 percent) in amyl alcohol (100 cm³). During the reaction (4 hours), the reaction medium was kept at 70°C. After distillation, the mixture yielded three fractions and a residue:

a. 25°/20 mm Hg. fraction: weighing 6.2 g contained 92 percent $C_4F_9$—CH=$CH_2$ and 8 percent $C_4F_9$—$C_2H_4$—I.

b. 44°/20 mm Hg. fraction: weighing 10.4 g contained 41 percent amyl alcohol and 59 percent $C_4F_9$—$C_2H_4$—I.

c. 44°/5 mm Hg. fraction: contained amyl alcohol.

d. Solid Residue: was mixed with 50 cm³ of a 10 percent by weight aqueous NaOH solution and the solution was extracted four times with 50 cm³ portions of ethyl ether. The ether extracts were dried upon anhydrous sodium sulfate. The ether was evaporated and the residual liquid distilled. 24.6 percent of a mixture containing 75 percent $C_6H_{11}$—NH—$C_2H_4OH$, 23.5 percent $C_4F_9$—$C_2H_4$—$N(C_6H_{11})$—$C_2H_4OH$ and 1.5 percent $C_3F_7$—CF=CH—$CH_2$—$N(C_6H_{11})$ $C_2H_4OH$ was obtained.

Yields for the experiment were 28.2 percent for $C_4F_9$—$C_2H_4$—$N(C_6H_{11})$—$C_2H_4OH$ and 1.8 percent for $C_3F_7$—CF=CH—$CH_2$—$N(C_6H_{11})$—$C_2H_4OH$.

EXAMPLE 21

A mixture of $C_6F_{13}(C_2H_4)_2I$ (100.4 g; 0.2 mole), ethanolamine (48.8 g; 0.8 mole), and amyl alcohol (200 cc) was heated at 80° during four hours, under constant stirring. The amyl alcohol was then eliminated by distillation, and a residue was obtained. This residue was stirred with 100 cc of a 10 percent aqueous solution of NaOH. The resulting solution was extracted with ethyl ether (4 times 100 cc), the ethereal extracts dried over anhydrous sodium sulfate, and then distilled. Besides ethyl ether, $C_6F_{13}(C_2H_4)_2NH$—$C_2H_4OH$ (74.3 g; 0.17 mole), boiling at 125°/2 mm Hg., was thus collected.

The conversion rate was 85 percent.

EXAMPLE 22

A mixture of $C_8F_{17}(C_2H_4)_2I$ (30.1 g; 0.05 mole), ethanolamine (12.2 g; 0.2 mole), and amyl alcohol (50 cc) was heated at 70° during four hours, under constant stirring. The mixture was then stirred with 30 cc of a 10 percent aqueous solution of NaOH and the resulting solution was extracted with ethyl ether (4 times 50 cc). After drying the ethereal extracts over anhydrous sodium sulfate and evaporating the ether, two fractions were obtained by distillation:

a. Fraction 75°/80 mm Hg. consisting of amyl alcohol.

b. Fraction 135°/1 mm Hg: 23g consisting of $C_8F_{17}(C_2H_4)_2$—NH—$C_2H_4OH$ (0.043 mole) melting about 40°.

Conversion rate was 86 percent.

EXAMPLE 23

A mixture of $C_6F_{17}(C_2H_4)_2I$ (25.1 g; 0.05 mole), N-methylethanolamine (15 g; 0.2 mole), and amyl alcohol (50 cc) was heated at 120° during 4 hours, under constant stirring. After cooling the reaction medium, it was stirred with 25 cc of a 10 percent aqueous solution of NaOH, then the resulting solution was extracted with ethyl ether (4 times 50 cc), and the ethereal extracts were dried over anhydrous sodium sulfate. The ethyl ether was then eliminated by evaporation and the residual liquid was distilled. Two fractions and a residue were thus collected:

a. Fraction 95°/150 mm Hg. consisting of amyl alcohol.

b. Fraction 90°/0.5 mm Hg: 18.5 g consisting of

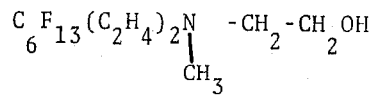

(0.041 mole).

c. Nonidentified solid residue 2 g.

Conversion rate for

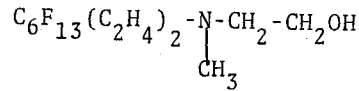

EXAMPLE 24

A mixture of $C_4F_9(C_2H_4)_2I$ (25 g; 0.062 mole), diethanolamine (26 g; 0.25 mole), and amyl alcohol (50 cc) was heated at 100° during 4 hours under constant stirring. After cooling the reaction medium, the resulting solution was stirred with 30 cc of a 10 percent aqueous solution of NaOH. The resulting solution was then extracted with ethyl ether (4 times 50 cc), and the ethereal extracts were dried over anhydrous sodium sulfate. The ethyl ether was then eliminated by evaporation, and the residual liquid was distilled. Two fractions were thus collected:
a. Fraction 90°/170 mm Hg. consisting of amyl alcohol.
b. Fraction 164°/3–4 mm Hg.: consisting of $C_4F_9(C_2H_4)_2$—N $(C_2H_4OH)_2$ (0.0495 mole).
Conversion rate of $C_4F_9(C_2H_4)_2$—N $(C_2H_4OH)_2$ is 80 percent.

We claim:

1. A perfluoroalkyl substituted aminoalcohol of the formula

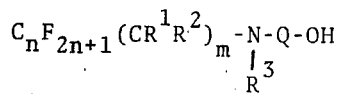

wherein $n$ is an integer from 4 to about 20, $m$ is 2 or 4, $R^1$ and $R^2$ each is a hydrogen atom or a lower alkyl containing 1 to 3 carbon atoms, Q is the radical —$(CHR)_q$ wherein R is a hydrogen atom or a lower alkyl containing 1 to 3 carbon atoms and $q$ is an integer from 1 to 10, and $R^3$ is a hydrogen atom, an alkyl containing 1 to 20 carbon atoms, a cycloalkyl containing 3 to 12 carbon atoms, a cycloalkenyl radical containing 5 to 12 carbon atoms, an aryl radical containing from 6 to 12 carbon atoms, the radical —Q—OH, or the radical $C_nF_{2n+1}(CR^1R^2)_m$.

2. An aminoalcohol according to claim 1 wherein at least one of the radicals $R^1$ and $R^2$ is hydrogen.

3. An aminoalcohol according to claim 2 wherein $n$ is from 6 to 12 and $m$ is 2.

4. An aminoalcohol according to claim 2 wherein $n$ is from 6 to 12 and $m$ is 4.

5. An aminoalcohol according to claim 3 in which R is hydrogen, $q$ is 2 and $R^3$ is phenyl.

6. The perfluoroalkyl aminoalcohol $(C_6F_{13}-C_2H_4)_2N-CH_2CH_2OH$

7. The perfluoroalkyl aminoalcohol $C_8F_{17}-CH_2-CH_2-NH-CH_2-CH_2OH$

8. The perfluoroalkyl aminoalcohol

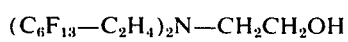

9. The perfluoroalkyl aminoalcohol

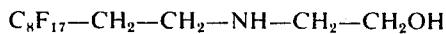

10. The perfluoroalkyl aminoalcohol $C_4F_9(C_2H_4)_2-N(C_2H_4OH)_2$

11. The perfluoroalkyl aminoalcohol $C_6F_{13}(CH_2-CH_2)_2 N(CH_2-CH_2OH)_2$

12. The perfluoroalkyl aminoalcohol

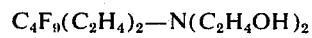

13. The perfluoroalkyl aminoalcohol

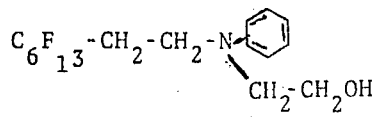

14. The perfluoroalkyl aminoalcohol

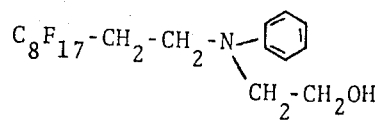

15. A perfluoroalkenyl substituted aminoalcohol of the formula

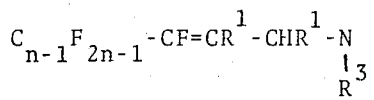

wherein $R^1$, $R^3$ and Q have the same meaning as defined in claim 1 and $n$ is an integer from 4 to 20.

16. An aminoalcohol according to claim 15 wherein $R^1$ and $R^3$ each is hydrogen.

17. An aminoalcohol according to claim 15 wherein $n$ is from 6 to 12.

18. An aminoalcohol according to claim 17 wherein R is hydrogen, $q$ is 2 and $R^3$ is phenyl.

19. The perfluoroaliphatic aminoalcohol

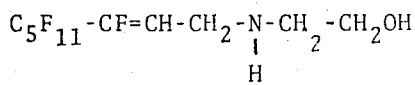

20. The perfluoroaliphatic aminoalcohol $C_9F_{19}-CF=CH-CH_2-NH-C_2H_4OH$

21. The perfluoroaliphatic aminoalcohol

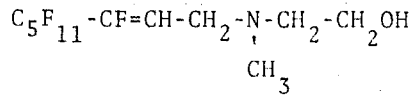

22. The perfluoroaliphatic aminoalcohol

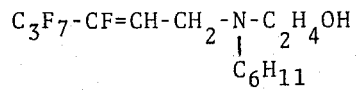

23. A composition of matter containing a mixture of a perfluoroalkyl aminoalcohol of the formula

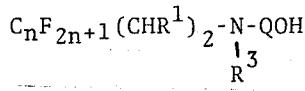

and an unsaturated perfluoroalkenyl aminoalcohol of the formula

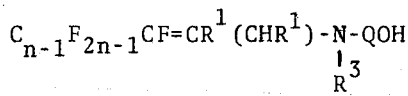

prepared by reacting a compound of the formula $C_nF_{2n+1}(CHR^1)_2$ Y with a compound of the formula $HR^3NQOH$ wherein Y is iodine or bromine and wherein $m$, $n$, $R^1$, $R^3$ and Q have the same meaning as defined in claim 1.

24. The composition of matter of claim 23 wherein $n$ is from 6 to 12 and $m$ is 2.

25. The composition of matter of claim 24 wherein R is hydrogen, $q$ is 2 and $R^3$ is phenyl.

26. The composition of matter of claim 23 wherein the mixture is $C_5F_{11}$—CF=CH—$CH_2$—NH—$CH_2$—$CH_2OH$ and $C_6F_{13}CH_2$—$CH_2$—NH—$CH_2$—$CH_2OH$.

27. The composition of matter of claim 23 wherein the mixture is $C_9F_{19}$—CF=CH—$CH_2$—NH—$C_2H_4OH$ and $C_{10}F_{21}$=$C_2H_4$—NH—$C_2H_4OH$.

28. The composition of matter of claim 23 wherein the mixture is $C_5F_{11}$-CF=CH-CH$_2$-N(CH$_3$)-CH$_2$-CH$_2$OH and

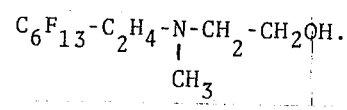

29. The composition of matter of claim 23 wherein the mixture is

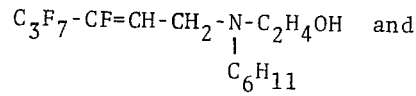

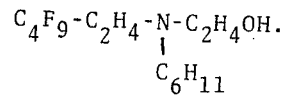

* * * * *

UNITED STATES PATENT AND TRADEMARK OFFICE
CERTIFICATE OF CORRECTION

PATENT NO. : 3,873,619
DATED : March 25, 1975
INVENTOR(S) : Louis Foulletier and Jean-Pierre Lalu It is certified that error appears in the above-identified patent and that said Letters Patent are hereby corrected as shown below:

In Column 3, line 48, " $-CH_2)_m-$ " should be -- $-(CH_2)_m-$ --.

In Column 16, line 15, " $C_{n-1}F_{2n-1}-CF=CR^1-CHR^1-\underset{\underset{R^3}{|}}{N}$ " should be -- $C_{n-1}F_{2n-1}-CF=CR^1-CHR^1-\underset{\underset{R^3}{|}}{N}-QOH$ --.

Signed and Sealed this seventh Day of October 1975

[SEAL]

Attest:

RUTH C. MASON
*Attesting Officer*

C. MARSHALL DANN
*Commissioner of Patents and Trademarks*